Jan. 23, 1951    J. H. KUHLMANN    2,539,144
ELECTRIC MOTOR

Filed March 28, 1949    2 Sheets-Sheet 1

*INVENTOR.*
JOHN H. KUHLMAN
BY
*ATTORNEY*

Jan. 23, 1951  J. H. KUHLMANN  2,539,144
ELECTRIC MOTOR
Filed March 28, 1949  2 Sheets-Sheet 2
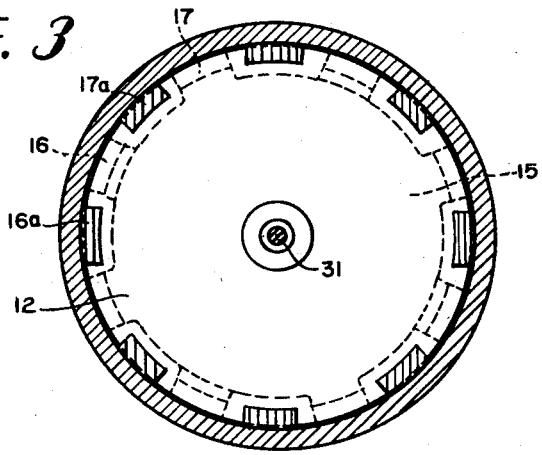
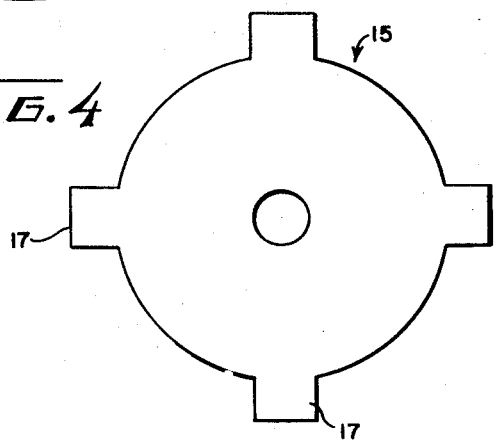
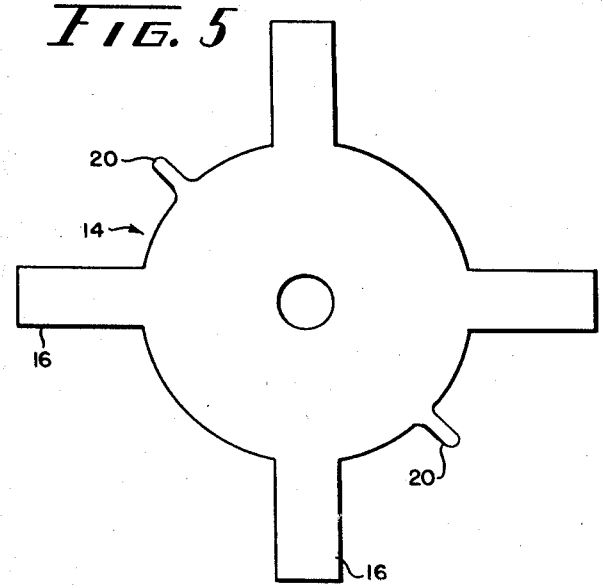
*INVENTOR.*
JOHN H. KUHLMAN
BY George H Fisher
*ATTORNEY*

Patented Jan. 23, 1951

2,539,144

UNITED STATES PATENT OFFICE 2,539,144

ELECTRIC MOTOR

John H. Kuhlmann, Minneapolis, Minn., assignor to Minneapolis-Honeywell Regulator Company, Minneapolis, Minn., a corporation of Delaware Application March 28, 1949, Serial No. 83,899

12 Claims. (Cl. 172—278)

My invention relates to alternating current motors and more particularly to split-phase or two-phase motors.

It is an object of this invention to provide a split or two-phase motor in which there are two independent field elements, each composed of pole piece structures magnetically secured to a magnetizing core with the pole piece structures having a plurality of poles thereon terminating in a common plane, and positioned in near abutting relationship with a disk-type rotor element spaced therebetween.

It is a further object of this invention to provide a disc-type hysteresis motor of this type which is simple and economical to manufacture in fractional horsepower ratings.

It is also an object of this invention to provide a motor of this type which is easily assembled, adjusted and maintained.

Other objects and features of this invention will become apparent from a reading of the description following in conjunction with the accompanying drawings in which:

Figure 3 is a sectional view of the motor of Figure 1 taken along the line 3—3 to disclose the relationship and spacing of the pole pieces of the motor.

Figures 4 and 5 are plan views of the respective pole piece laminations which go to make up the individual stator or field elements.

Figure 1:
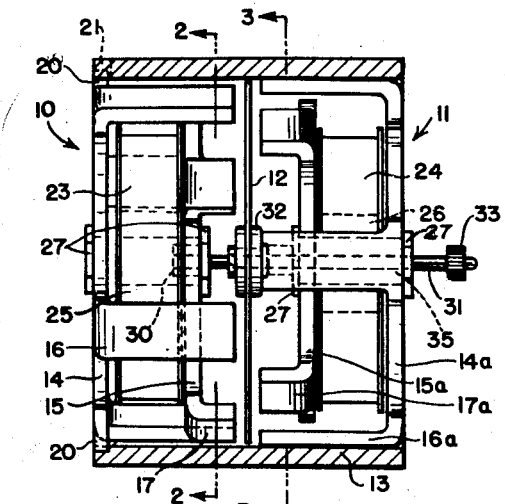
Figure 1 is a plan view of the motor with the casing sectioned away to disclose the magnetic field elements or stators and the rotor.

Referring to the disclosure, my improved motor is a two-phase or capacitor type motor having two magnetically independent stator elements 10 and 11 positioned in near abutting relationship along a common center line with a disk type hysteresis rotor 12 positioned between the elements. Stator or field elements 10 and 11 are cup-shaped or cylindrical in form having the same diametrical dimension and the same axial thickness. The disk type rotor element 12 is a circular plate having approximately the same diametrical dimension as the field or stator elements 10 and 11. The stator elements 10 and 11 and the rotor 12 are assembled in a cylindrical non-magnetic housing 13, each field element being positioned therein to a predetermined depth to provide predetermined spacing between the field elements and the rotor 12 cooperating with them. The over-all axial dimension of the casing, as indicated in Figure 1, is such as to accommodate the individual axial dimensions of the stator elements, the rotor and the spacings provided between the elements.

Figure 2:
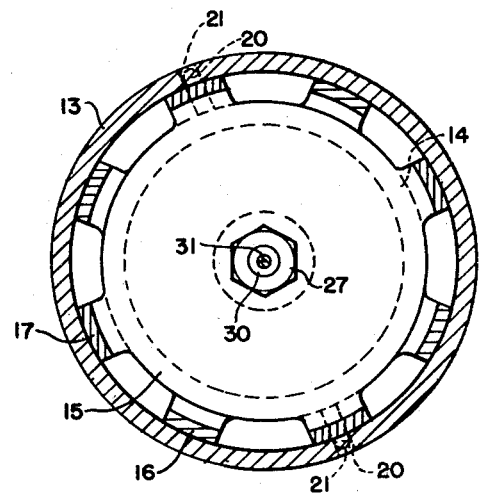
Figure 2 is a sectional view of the motor in Figure 1 taken along the lines 2—2.

Each of stator elements 10 and 11 includes pole piece members 14, 14a and 15, 15a respectively formed from the stampings indicated in Figures 4 and 5. As indicated in Figures 4 and 5, the pole piece members 14 and 15 which go to make up stator element 10 and which are identical to elements 14a, 15a have poles 16 and 17 respectively, extending therefrom. In completed form, the poles are stamped or bent at right angles to the main portion of the pole piece member and extend normal thereto. The pole piece member 14 also includes lug members 20 which are not bent in the same manner as the poles 16 are but rather remain in the same plane with the body of the pole piece member. As will be later noted the lugs 20 cooperate with notches 21 in the casing member 13 to position the field elements within the casing. Similar lugs are provided in member 14a to cooperate with notches in the opposite end of casing 13, and while they are not shown in the drawing, it is to be understood that they are located at the opposite end of the motor and position field element 11 within the casing 13. Each stator element includes a coil 23, 24 which is mounted on a core 25, 26 and positioned between a pair of pole piece members 14, 15 and 14a, 15a respectively. Thus stator or field element 10 includes a core 25 with a coil 23 mounted thereon and pole piece members 14 and 15 with the poles 16 and 17 extending in the same direction fastened at opposite extremities of the core 25. The core 25 at each extremity has a threaded portion upon which is positioned lock nuts 27 to maintain the pole piece members 14 and 15 in assembled relationship with the core 25 and coil 23. As indicated in Figure 2 and in Figures 4 and 5, the individual poles 16 and 17 on the respective pole piece members 14 and 15 are spaced equidistantly apart, each member having four poles or pole elements. In assembled relationship, the poles 16 and 17 of the pole piece members 14 and 15 extend in an axial direction normal to the main portions of the respective pole piece members, the individual poles being spaced within the spacings between the poles on the opposite pole piece member. The sectional view of the motor in Figure 2 discloses the field element or stator 10 in plan view within the casing 13. As can be seen in this figure, the lugs 20 cooperate with recesses 21 in the casing member 13 to position the poles radially with respect to the casing and also position the field element 10 to a predetermined depth within the casing 13.

In assembled relationship, the axially extending poles 16 and 17 of field element 10 describe a circular path concentric with the center line of the motor. The poles also terminate in the same plane. With this relationship, as will be later noted, the pole tips are positioned equidistantly from the rotor element 12 which is mounted between the field elements or stators 10 and 11.

Mounted in an aperture in the extremity of core 25 of field element 10 is a bearing insert 30, this bearing insert being held in fixed relationship with the core 25 and pole members 14 and 15 by the lock nut 27. The bearing insert 30 journals the shaft 31 upon which is mounted the rotor member 12. Rotor 12 is a circular disk of hardened and permanent magnet material. This element is mounted on the shaft 31 by means of a pair of bushings 32 which are press-fitted onto the shaft and designed to hold the circular or plate portion of the rotor in concentric relationship with the shaft 31.

Field element 11 is generally similar to field element 10 differing therefrom only in that the shaft 31 upon which rotor 12 is mounted extends therethrough terminating with a pinion 33 external of the motor. Like field element 10, the stator or field element 11 is also press-fitted into the casing 13 being positioned into the casing at a predetermined depth determined by the engagement of the lugs on the pole piece member 14a with grooves on the casing which lug and grooves, as noted above, are not shown in the drawings. Field element 11 includes a core 26 upon which is mounted a coil 24. Pole piece stampings or members 14a, 15a are assembled on the magnetic core 26 in the same manner as described in connection with field element 10. The lock nuts 27 mount on the threaded portions of the core 26 to hold the pole piece members in assembled relationship with the core and coil. Core 26 differs from core 25 in that it has a cylindrical aperture therethrough in which is positioned a sleeve type bearing 35 adapted to receive and journal the shaft 31. In assembled relationship, the field element 11 resembles the field element 10 disclosed in Figure 2, the poles 16a and 17a being spaced equidistantly from one another along a circular path whose diametrical dimension is such as to be accommodated within the casing 13. The field elements 10 and 11 are positioned at such a depth within the casing that a predetermined air gap is obtained between the pole pieces 16, 17 and 16a, 17a on the field elements. Within this air gap is positioned the rotor 12 which is designed to rotate within and be affected by the flux lines emanating through the air gap.

Figure 3 discloses the assembled relationship of the poles of each of the field elements 10 and 11. It will be noted that the poles 16 and 17 of field element 10 are displaced from the poles 16a and 17a and the field element 11 such that the poles on one element are positioned adjacent the spacings between the poles on the other element. Similarly th poles of the respective elements are arranged in such a sequence that the poles from like polarity ends of the respective coils are positioned adjacent one another. Thus, in the Figures 1 and 3 it will be noted that the poles 16, 16a extending from like ends of the magnetic cores 25, 26 are positioned or spaced adjacent to one another and the poles 17, 17a emanating from like ends of the magnetic cores 25, 26 are similarly positioned adjacent one another. Thus in sequence around the periphery or circular line of pole pieces, there will be found in order a pole 16 from one magnetic core, a pole 16a from the opposite magnetic core, a pole 17 from the first magnetic core, and a pole 17a from the opposite magnetic core. With the coils 23, 24 energized by currents displaced in phase from one another, there will exist within the field structure composed of the two magnetic field elements a rotating flux field which acting upon the rotor element 12 causes it to rotate.

Figure 6:
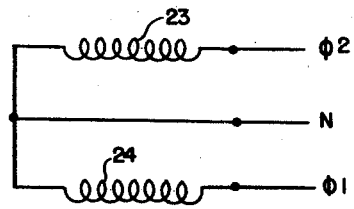
Figures 6, 7 and 8 are schematic circuit diagrams of various methods of energizing the motor.
Figure 8:
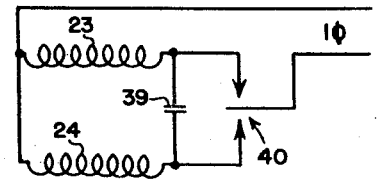
Figure 7:
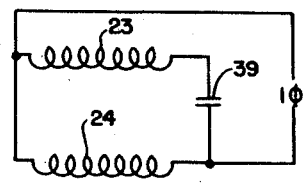

Figures 6, 7 and 8 disclose several well known methods of energizing two-phase motors of the type described herein. Figure 6 shows a two-phase source $\phi_1$, $\phi_2$, each of the windings 23, 24 being energized between a line phase and a neutral connection N. The direction of rotation of the motor under such circumstances will depend upon the phase relationship between the exciting currents. Figures 7 and 8 disclose the well known method of connecting such a two-phase motor with a condenser such that the motor may be energized from a single phase source $1\phi$. In Figure 7 winding 24 is energized directly across the line and winding 23 is energized in series with a condenser 39 which operates to shift the phase of the exciting current and thereby provide a rotating flux field for the field elements of the motor. Figure 8 discloses a similar arrangement of energizing such a motor from a single-phase source but includes the provision of a switching device 40 by which the condenser 39 may be connected in series with one or the other of the windings thereby varying direction of rotation of the flux field in the stator and hence the rotation of the rotor element of the motor.

This improved alternating current type two-phase motor or split-phase motor will operate in the conventional manner. The coils 23 and 24 each being energized with an alternating current displaced in phase from one another will induce into their respective pole pieces an instantaneous alternating flux. The pole pieces attached in one extremity of each magnetic core will have an instantaneous magnetic polarity 180 degrees out of phase with the respective pole piece attached to the opposite end of the same magnetic core. As the two coils are energized by currents displaced in phase from one another a rotating magnetic field will be obtained. This rotating magnetic field will act upon the disk-type rotor of magnetic material to produce a rotational effect which is well known in the art of the hysteresis motors. The combined field elements forming the stator will be in effect an eight-pole motor having the synchronous speed of 900 revolutions per minute at 60 cycles. The field elements 10 and 11 comprising the magnetic field or stator of this motor are magnetically independent of one another save through the cooperation of the rotor. Since the field elements 10 and 11 are positioned within a non-magnetic casing and held in fixed relationship therein, the flux paths for these motors are through the individual pole piece elements and across the air gap to the rotor returning by the same path.

This motor design is simple and economical and is readily adapted to punch press type of manufacture since the individual pole members and the rotor may readily be stamped or similarly shaped. The motor is similarly easily assembled since the pole piece members are merely mounted on the cores of the respective coils and secured thereto by lock nuts. The rotor is also accurately positioned inasmuch as it is journaled in the sleeve-type bearings mounted in each of the respective core members of the field elements and attachment to the rotor shaft is facilitated by the extension of the same through one of the field elements 11 to a point external of the motor. Field elements 10 and 11 are also accurately and securely positioned in the casing 11 by means of lug members 20 which cooperate with notches 21 on the casing 13 to accurately space the field elements apart and securely hold the elements in assembled relationship. Such a motor design is simple and economical to manufacture and maintain.

In considering this invention it should be kept in mind that the present disclosure is intended to be illustrative only and the scope of the invention is to be determined by the appended claims.

I claim:

1. A split phase alternating current motor comprising two magnetically independent stators, each stator including a single phase energizing coil mounted on a magnet core member and having pole piece members with poles thereon attached at opposite ends of said magnetic core and adapted to be energized with opposite instantaneous magnetic polarities, said poles of each stator extending axially of said motor and being equidistantly spaced apart along a circular path a distance greater than the width of each pole, said stators being mounted such that the poles thereon are in near abutting relationship, and a rotor positioned in a plane normal to the axial extent of said poles and between said poles, said rotor being journaled in the magnetic cores of the stators.

2. A split phase alternating current motor comprising two magnetically independent stators, each stator including a single phase energizing coil mounted on a magnetic core member and having pole piece members with poles thereon attached at opposite ends of said magnetic core and adapted to be energized with opposite instantaneous magnetic polarities, said poles of each stator extending axially of said motor and being equidistantly spaced apart along a circular path a distance greater than the width of each pole, said stators being mounted such that the poles thereon are in near abutting relationship, a rotor positioned in a plane normal to the axial extent of said poles and between said poles, said rotor being journaled in the magnetic cores of said stators, and means for energizing said coils with alternating currents of the same frequency displaced in phase from one another.

3. A split phase alternating current motor comprising two magnetically independent stators, each stator including a single phase energizing coil mounted on a magnetic core member and having pole piece members with pole pieces thereon attached at opposite ends of said magnetic core and adapted to be energized with opposite instantaneous magnetic polarities, said poles of each stator extending axially of the motor and being equidistantly spaced apart along a circular path a distance greater than the width of each pole, said stators being mounted with the poles of one stator positioned adjacent a space between the poles of the other stator in near abutting relationship, and a rotor positioned in a plane normal to the axial extent of said poles and between said poles, said rotor being journalled in the magnetic cores of said stators.

4. A split phase alternating current motor comprising two magnetically independent stators, each stator including a single phase energizing coil mounted on a magnetic core member and having pole piece members with pole pieces thereon attached at opposite ends of said magnetic core and adapted to be energized with opposite instantaneous magnetic polarities, said poles of each stator extending axially of the motor and being equidistantly spaced apart along a circular path a distance greater than the width of each pole, said stators being mounted such that the poles thereon are in near abutting relationship and with the poles from like extremities of said magnetic cores being positioned adjacent to one another, and a rotor positioned in a plane normal to the axial extent of said poles and between said poles, said rotor being journalled in the magnetic cores of said stators.

5. A split phase alternating current motor comprising two magnetically independent stators, each stator including a single phase energizing coil mounted on a magnetic core member and having pole piece members with pole pieces thereon attached at opposite ends of said magnetic core and adapted to be energized with opposite instantaneous magnetic polarities, said poles of each stator extending axially of the motor and being equidistantly spaced apart along a circular path a distance greater than the width of each pole, said stators being mounted with the pole pieces of one stator positioned adjacent a space between the poles of the other stator in near abutting relationship and with the poles from like extremities of said magnetic cores being positioned adjacent one another, and a rotor positioned in a plane normal to the axial extent of said poles and between said poles, said rotor being journalled in each of the magnetic cores of said stators.

6. An alternating current motor comprising two magnetically independent stators, each stator including a single phase energizing coil mounted on a magnetic core member and having pole piece members with poles thereon attached at opposite ends of said magnetic cores, said poles of each stator being equidistantly spaced apart along a circular path a distance substantially equal to the width of a pole, said stators being mounted such that the poles thereon are positioned in near abutting relationship, and a disc type rotor positioned between the poles, said rotor being journaled in the magnetic cores of each stator.

7. An alternating current motor comprising two magnetically independent stators, each stator including a single phase energizing coil mounted on a magnetic core member and having pole piece members with poles thereon attached at opposite ends of said magnetic cores, said poles of each stator being equidistantly spaced apart along a circular path a distance substantially equal to the width of a pole, said stators being mounted such that the poles thereon are positioned in near abutting relationship, means for energizing said coils with alternating currents of the same frequency displaced in phase from one another, and a disc type rotor of electrically conductive material positioned between said poles, said rotor being journaled in the magnetic cores of each stator.

8. An alternating current motor comprising two magnetically independent stators, each stator including a single phase energizing coil mounted on a magnetic core member and having pole piece members with poles thereon attached at opposite ends of said magnetic cores, said poles of each stator being equidistantly spaced apart along a circular path a distance substantially equal to the width of a pole, said stators being mounted in near abutting relationship with the poles of each stator positioned adjacent the space between the poles of the other stator, means for energizing said coils with alternating currents of the same frequency displaced in phase with one another, and a disc type rotor of magnetic material positioned between said poles, said rotor being journalled in the magnetic core of each stator.

9. An alternating current motor comprising two magnetically independent stators, each stator including a single phase energizing coil mounted on a magnetic core member and having pole piece members with poles thereon attached at opposite ends of said magnetic cores, said poles of each stator being equidistantly spaced apart along a circular path a distance substantially equal to the width of a pole, said stators being mounted in near abutting relationship with the poles from like extremities of said magnetic cores being positioned adjacent one another, means for energizing said coils with alternating currents displaced in phase from one another, and a disc type rotor of magnetic material positioned between said poles, said rotor being journaled in the magnetic core of each stator.

10. An alternating current motor comprising two magnetically independent stators, each stator including a single phase energizing coil mounted on a magnetic core member and having pole piece members with poles thereon attached at opposite ends of said magnetic cores, said poles of each stator being equidistantly spaced apart along a circular path a distance substantially equal to the width of a pole, said stators being mounted in near abutting relationship with the poles of one stator positioned adjacent the space between the poles of the other stator and with the poles from like extremities of said magnetic cores positioned adjacent one another, means energizing said coils with alternating current displaced in phase from one another, and a disc type rotor positioned between said poles, said rotor being journalled in the magnetic core of a stator.

11. An alternating current motor comprising two magnetically independent stators, each stator including a single phase energizing winding mounted on a magnetic core member and having pole piece members with poles thereon attached at opposite ends of said magnetic core and adapted to be energized with opposite instantaneous magnetic polarities, said poles of each stator extending axially and being equidistantly spaced apart along a circular path a distance greater than the width of a pole, said stator being mounted such that the poles thereon are in near abutting relationship, and a disc type rotor mounted on a shaft which is journalled at each extremity in said magnetic cores, said rotor being positioned between said poles, said rotor shaft extending through one of said magnetic cores.

12. An alternating current motor comprising two magnetically independent stators, each stator including a single phase energizing coil mounted on a magnetic core member and having pole piece members with poles thereon attached at opposite ends of said magnetic core and adapted to be energized with opposite instantaneous magnetic polarities, said poles of each stator extending axially and being equidistantly spaced apart along a circular path a distance greater than the width of a pole, said stators being mounted in near abutting relationship with the poles of one stator positioned adjacent the space between the poles of the other stator and with the poles from like extremities of said magnetic core positioned adjacent to one another, and a disc type rotor positioned in a plane normal to the axial extent of said poles and between said poles, said rotor being mounted on a shaft which is journalled at each extremity in said magnetic cores, said rotor shaft extending through one of said magnetic cores.

JOHN H. KUHLMANN.

REFERENCES CITED

The following references are of record in the file of this patent:

UNITED STATES PATENTS

| Number | Name | Date |
|---|---|---|
| 2,070,447 | Morrill | Feb. 9, 1937 |

FOREIGN PATENTS

| Number | Country | Date |
|---|---|---|
| 103,184 | Australia | Feb. 2, 1938 |